March 25, 1952 S. S. SLYK 2,590,278
OIL CHECK FOR PISTON RINGS
Filed Feb. 18, 1946
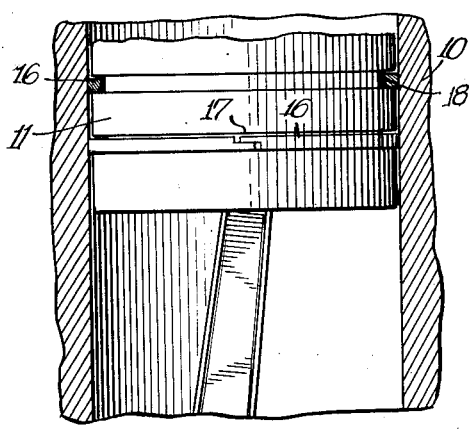
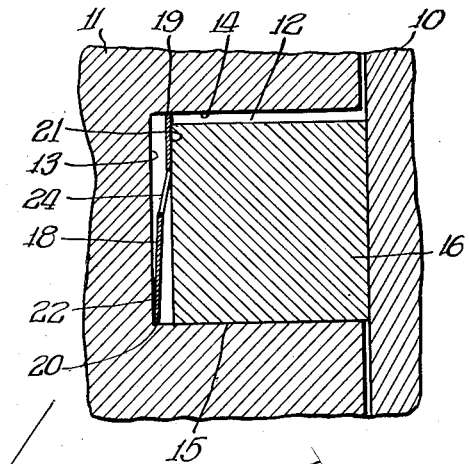
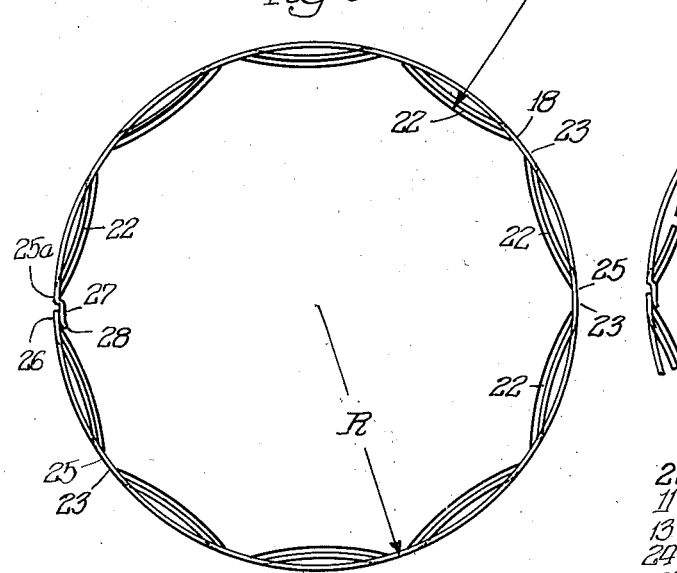
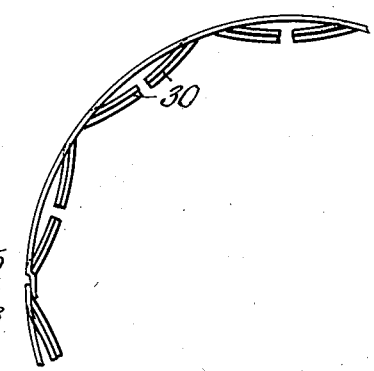
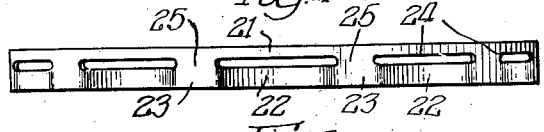
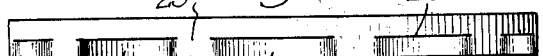
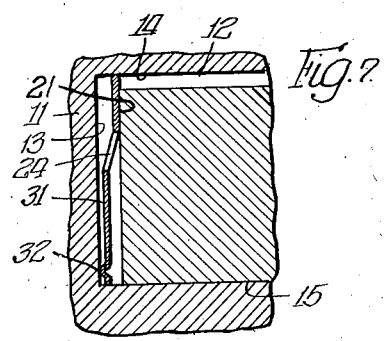
INVENTOR.
Stanley S. Slyk,
BY Wilkinson, Huxley, Byron & Knight
attys.

Patented Mar. 25, 1952

2,590,278

UNITED STATES PATENT OFFICE 2,590,278

OIL CHECK FOR PISTON RINGS

Stanley S. Slyk, Chicago, Ill.

Application February 18, 1946, Serial No. 648,413

19 Claims. (Cl. 309—45)

The present invention relates to improvements in oil checks.

More particularly the present invention relates to means for minimizing the leakage of oil past the piston of an internal combustion motor. The piston of an internal combustion motor is ordinarily provided with piston rings, one or more of which are commonly designed to minimize the leakage of oil from the crank case into the cylinder.

An object of the present invention is to provide an improved oil check adapted to co-operate with a piston ring to minimize the leakage of oil past the said piston ring.

A further object is to provide improved means adapted to be located inwardly of a piston ring and having the dual function of minimizing the flow of oil past said piston ring and of biasing said piston ring outwardly against the cylinder wall.

A further object is to provide an improved oil check adapted to be associated with a piston ring in the internal combustion motor which oil check is effective in operation, though simple and sturdy in construction.

A further object is to provide an improved oil check adapted to be used in combination with a piston ring, which may be readily inserted into the piston ring groove and which in service is effective in checking the leakage of oil past the said piston ring.

A further object is to provide a resilient oil check adapted to be located easily within a piston ring groove but which, in service, will resiliently contact the walls of said groove which are disposed in right angular relationship with the axis of movement of the corresponding piston and will check the passage of oil past the ring in said groove.

A further object is to provide an improved oil check which is simple and sturdy in construction, is easy to install, and well adapted to meet the needs of ordinary service.

Further objects will appear as the description proceeds.

Referring to the drawings—

Figure 1 is a view in sectional elevation showing a piston located within a cylinder wall, which piston is provided with an embodiment of the present invention;

Figure 2 is a view on an enlarged scale of a portion of the structure shown in Figure 1;

Figure 3 is a top plan view of an oil check embodying the principles of the present invention;

Figure 4 is a view in side elevation of the oil check illustrated in Figure 3;

Figure 5 is a view similar to Figure 4, but illustrating an oil check having a narrower opening for the passage of oil;

Figure 6 is a view similar to Figure 3 but illustrating a slight modification; and Figure 7 is a view similar to Figure 2 but illustrating another modification.

The numeral 10 indicates a cylinder wall. Mounted for reciprocation within said cylinder wall is the piston 11, which piston may be provided with a plurality of circumferential grooves or channels for the reception of piston rings.

For purposes of convenience in the description of the present invention, the axis of reciprocation of the piston 11 will be considered to be vertical though it will be understood, of course, that this axis may be at any angle in relation to the vertical. A groove adapted to receive a piston ring is indicated by the numeral 12. Said groove 12 has the outwardly facing circumferential wall 13 (which will be referred to as the groove bottom wall) bounded by the groove upper wall 14 and the groove lower wall 15. Within said groove 12 is located the piston ring 16 which, according to usual practice, is split in its perimeter and is provided with the lap joint 17. In practice, there is commonly a certain amount of play of the piston ring 16 in the groove 12 in a direction axially of the piston. In a motor in which the cylinder wall is true and cylindrical there will be no appreciable movement of the piston ring in a radial direction. However, as the cylinder wall wears in service, it becomes conical in shape, being larger toward the combustion chamber, that is, toward the top as the parts are viewed in Figure 1. Accordingly in a worn motor there is a reciprocating action of the piston ring 16 in a radial direction, it being noted that the piston ring, being split, is biased outwardly by its own resiliency. Moreover, the piston ring, according to common practice, will be urged outwardly in a radial direction by an expander spring.

Located between the wall 13 of the groove 12 and the piston ring 16 is the oil check 18 which embodies the principles of the present invention. Said oil check, as illustrated in Figure 3, is in the form of a ring split in its perimeter and provided with a lap joint as will be described presently. Said oil check embodies a peripheral wall biased radially outwardly against the inner surface of the corresponding piston ring 16.

Figure 2 represents the oil check 18 under conditions of service in which the upper and lower edges, designated 19 and 20, respectively, are located in engagement with the groove upper wall 14 and the groove lower wall 15, respectively, of the groove 12. As the parts are illustrated in Figure 2, the piston ring 16 is located in engagement with the lower wall 15 of the groove 12. The amount of play between the piston ring 16 in the groove 12 is shown exaggerated in Figure 2.

The oil check 18, in its biased or normal condition, should have an axial overall dimension something less than the distance between the walls 14 and 15 of the groove 12 so that said oil check 18 may be readily inserted into said groove. However, when the piston ring 16 is located in position in the groove 12 radially outwardly of the oil check 18, said oil check 18 will be distorted to reduce the radial dimension of the peripheral wall thereof which action will result in the lengthening of portions of said wall axially to cause the edges 19 and 20 to engage firmly against the walls 14 and 15, respectively, of the groove 12.

The function of the oil check 18 in expanding axially when its peripheral wall is reduced radially will result from the features which will now be described.

Referring to Figures 2, 3, 4, and 5, the oil check 18 is made up of an approximately cylindrical portion 21. The lower portion of the oil check 18 is provided with a plurality of circumferentially spaced scallops 22—22 connected by intervening circumferential portions 23—23 which scallops 22—22 are swedged inwardly toward the axis of the oil check 18. In other words, the scallops 22—22 are offset from the approximately cylindrical portion 21, being shown in Figure 2 as inclined to said cylindrical portion 21. The lower extremities of the scallops 22—22 are adapted to contact against the wall 13 of the corresponding groove. It will be noted that intermediate of the openings 24—24 are the approximately cylindrical portions 25—25. It will be noted that in the structure illustrated in Figure 4 the approximately cylindrical portion 21, the portions 25—25, and the portions 23—23 provide segments of a circle disposed intermediate of the openings 24—24. The radius of each scallop 22 at the bottom thereof is approximately equal to the radius of the cylindrical portion 21. Ordinarily the entire oil check 18 will be made of resilient material. In any case, the portion thereof below the openings 24—24 should be resilient. Since the scallops 22—22 are offset from the cylindrical portion 21, being inclined with reference thereto in Figure 2 and since the overall height of the oil check at the regions of said scallops is the maximum height of said oil check, the result is that when said scallops are moved toward alignment with the cylindrical portion 21 there will be an increase in the vertical overall dimension or height of the oil check; that is, as the scallops 22—22 are moved toward the axis of the piston, the vertical dimension of the oil check at the regions symmetrical with said scallops is increased over the vertical dimension at the regions 23—25.

Expressed in still different words, the peripheral wall of the oil check 18, by reason of the inwardly swedged scallops 22—22 and by reason of the openings 24—24, is collapsible in a radial direction, the height between the edges 19 and 20 depending upon the amount of this variation in radial dimension. No great exactness in the dimensions of the oil check 18 is necessary in view of the fact that the wall of the oil check may buckle and change its contour to conform to the distance between the upper wall 14 and the lower wall 15 of the groove 12. Wide tolerances in the dimensions of the oil check 18 are permissible not only because the contour of said wall may vary in cross section but for the further reason that the joint located in the circumference of the oil check permits adjustment.

By reference to Figure 3, it will be noted that one end of the split wall of the oil check 18 is provided with the lip 26 which may lie in substantially the circumference occupied by the portions 25—25 of the oil check. The other extremity of the oil check is provided with the lip 27 having the inwardly turned end 28. Said lip 27 and turned end 28 are adapted to underlie the lip 26. Said lip 27, it will be noted, is offset inwardly from a portion 25a corresponding in circumferential dimension to about half of the corresponding dimension to each of the portions 25—25.

In the embodiment of the invention illustrated in Figure 4, openings 24—24 of a considerable dimension in a vertical direction have been illustrated. In the embodiment of the invention illustrated in Figure 5, the vertical dimensions of these openings have been very considerably reduced. According to the structure illustrated in Figure 5, slits 29—29 perform the functions of the openings 24—24 of Figure 4. Said slits provide sufficient openings for the passage of oil for many types of installation.

Preferably the slots 24—24 (Figures 2 and 4) and the slits 29 (Figure 5) will be symmetrically disposed along a circumferential line spaced from the upper edge 19, a distance about one-third of the height of the oil check 18.

In the modification illustrated in Figure 6, the scallops 22—22 are interrupted intermediate of their lengths to provide cantilever spring portions 30—30 which perform functions analogous to those of scallops 22—22 in engaging the wall 13 of the groove 12 to cause the lengthening of the oil check axially to force the upper and lower edges 19 and 20 into engagement with the upper wall 14 and the lower wall 15 of the groove 12.

According to the modification illustrated in Figure 7, the portions or scallops of the oil check below the opening 24—24 may be approximately cylindrical in contour, one of these approximately cylindrical portions or scallops being indicated by the numeral 31. Said portions 31 include the inclined parts located between the openings 24. Said portions or scallops 31, near the lower edges thereof, are provided with the outstruck bosses 32 adapted to engage the cylindrical wall 13 of the groove 12.

The mode of operation of the various illustrations of the present invention is substantially as follows:

The oil check 18 will have a biased overall dimension between this lower edge 20 and this upper edge 19 of a value less than the distance between the upper wall 14 and the lower wall 15 of the groove 12 so that said oil check may be readily mounted within said groove. When the piston ring 16 has been inserted and the piston 11 is mounted within the cylinder wall 10, the wall of the oil check 18 will be decreased in a radial direction whereby the dimension between the edge 20 at the regions of the scallops 22—22 or the scallops 33—33 and the edge 19 will be lengthened, resulting in the firm engagement of said edges with the bottom wall 15 and the top wall 14, respectively, of the groove 12 and the close engagement of the cylindrical portion 21 with the adjacent surface of the piston ring 16. The cylindrical portion 21 will, regardless of any play of the piston ring 16 in an axial direction, act effectively to prevent the passage of oil past the piston ring at the top of said ring. Any oil collecting between the oil check 18 and the wall 13 of the groove 12 will be permitted to pass through the openings 24—24 (Figure 4) or the openings 29—29 (Figure 5).

Though certain and preferred embodiments of the present invention have been described in detail, many modifications will occur to those skilled in the art. It is intended to cover all such modifications that fall within the scope of the appended claims.

What is claimed is:

1. In combination, a cylinder wall, a piston therein, said piston having an annular groove, a piston ring in said groove, an annular oil check located in the annular space between the circumferential wall of said groove and the adjacent side of said piston ring, said oil check being resilient and having a biased overall dimension axially of said piston such that it will fit readily into said groove, said oil check having an approximately cylindrical portion adapted to engage the adjacent side of said piston ring and the adjacent side of said groove, said oil check having portions offset relative to said cylindrical portion, parts at least of said offset portions being inclined relative to the axis of said piston, said oil check being expansible into firm engagement with the top and bottom walls of said groove when pressure is exerted radially upon said oil check between said circumferential wall and said piston ring.

2. In combination, a cylinder wall, a piston therein, said piston having an annular groove, a piston ring in said groove, an annular oil check located in the annular space between the circumferential wall of said groove and the adjacent side of said piston ring, said oil check being resilient and having a biased overall dimension axially of said piston such that it will fit readily into said groove, said oil check having an approximately cylindrical portion adapted to engage the adjacent side of said piston ring and the adjacent side of said groove, said oil check having portions offset relative to said cylindrical portion, parts at least of said offset portions being inclined relative to the axis of said piston, said oil check being expansible into firm engagement with the top and bottom walls of said groove when pressure is exerted radially upon said oil check between said circumferential wall and said piston, said oil check being split in its perimeter, the ends of said oil check providing a lap joint.

3. In combination, a piston having a circumferential piston ring groove, a split piston ring in said groove and an annular oil check located in said groove inside of said piston ring, said oil check comprising a member having an approximately cylindrical portion adapted to engage the top wall of said groove and the adjacent wall of said ring and inwardly extending offset resilient portions adapted to engage the circumferential wall and the bottom wall of said groove, said oil check being biased to a dimension axially of said piston such that said oil check will fit easily into said groove, parts at least of said offset portions being inclined relative to the axis of said piston, said oil check being expansible axially of said piston in response to radial compression of the wall of said oil check whereby the edge portions of oil check will engage firmly against the top and bottom walls of said groove, while the cylindrical portion thereof engages said piston ring.

4. An oil check comprising a ring member, a portion adjacent to one edge thereof being approximately cylindrical, the portion thereof adjacent to the opposite edge being resilient and having parts thereof inclined inwardly in circumferentially spaced scallops and adapted to engage the circumferential wall and the diametrical walls of a piston ring groove, said oil check at said inwardly inclined portion having at least as great a height as the overall axial height of said oil check whereby when said inwardly inclined portion is moved toward alignment with said cylindrical portion the overall height of said check is increased.

5. An oil check comprising a ring member, a portion adjacent to one edge thereof being approximately cylindrical, the portion thereof adjacent to the opposite edge being resilient and having parts thereof inclined inwardly in circumferentially spaced scallops and adapted to engage the circumferential wall of a piston ring groove, the region between each of said inclined parts and said cylindrical portion being defined by circumferentially disposed openings, said oil check at said inwardly inclined portion having at least as great a height as the overall axial height of said oil check whereby when said inwardly inclined portion is moved toward alignment with said cylindrical portion the overall height of said check is increased.

6. An oil check comprising a ring member, a portion adjacent to one edge thereof being approximately cylindrical, the portion thereof adjacent to the opposite edge being resilient and having parts thereof inclined inwardly in circumferentially spaced scallops and adapted to engage the circumferential wall of a piston ring groove, the region between each of said inclined parts and said cylindrical portion being defined by circumferentially disposed openings located approximately one-third of the height of said oil check measured downwardly from the edge of the circular portion thereof, said oil check at said inwardly inclined portion having at least as great a height as the overall axial height of said oil check whereby when said inwardly inclined portion is moved toward alignment with said cylindrical portion the overall height of said check is increased.

7. An oil check comprising a split ring member, a portion adjacent to one edge thereof being approximately cylindrical, the portion thereof adjacent to the opposite edge being resilient and being inclined inwardly with respect to the axis of said ring member at regions spaced about said ring member, said ring member at the regions of said inclined portions being at least equal in height to the axial overall height of said oil check whereby when said inwardly inclined portion is moved toward alignment with said cylindrical portion, the overall height of said oil check is increased.

8. An oil check comprising a split ring member, a portion adjacent to one edge thereof being approximately cylindrical for close engagement with the inner surface of a piston ring, the portion thereof adjacent to the opposite edge being resilient and being inclined inwardly progressively with respect to the axis of said ring member in scallops at regions spaced about said ring, the regions between said inclined parts and said cylindrical portion being defined by circumferentially disposed openings.

9. An oil check comprising a split ring member, a portion adjacent to one edge thereof being approximately cylindrical for close engagement with the inner surface of a piston ring, the portion thereof adjacent to the opposite edge being resilient and being inclined inwardly with respect to the axis of said ring member in scallops at regions spaced about said ring, the regions between said inclined parts and said cylindrical portion being defined by circumferentially disposed openings, said inwardly inclined portions, adjacent to their free edges being provided with inwardly presented bosses.

10. An oil check comprising a split ring member, a portion adjacent to one edge thereof being approximately cylindrical, the portion thereof adjacent to the opposite edge being resilient and having a part thereof inclined inwardly with respect to the axis of said ring member in scallops at regions spaced about said ring member, the regions between said approximately cylindrical portion and said opposite edge being provided with circumferentially spaced openings registering with said inwardly inclined portions.

11. An oil check comprising a split ring member, a portion adjacent to one edge thereof being approximately cylindrical, the portion thereof adjacent to the opposite edge being resilient and having parts thereof inclined inwardly with respect to the axis of said ring member in scallops at regions spaced about said ring member, the regions between said approximately cylindrical portion and said opposite edge being provided with circumferentially spaced openings registering with said inwardly inclined portions, said openings being located closer to said first mentioned edge than to said opposite edge of said ring member.

12. An oil check comprising a split ring member, a portion adjacent to one edge thereof being approximately cylindrical, the portion thereof adjacent to the opposite edge being resilient and having parts thereof inclined inwardly with respect to the axis of said ring member in scallops at regions spaced about said ring member, said inwardly swedged portions being cantilever members.

13. A combined oil check and expander for a piston ring comprising a split ring member, the portion adjacent to one edge thereof being approximately cylindrical whereby to conform to the inner surface of a piston ring, the portion thereof adjacent to the opposite edge having parts thereof inclined with respect to the axis of said ring member in scallops at regions spaced about said ring, said combined oil check and expander being resilient.

14. An oil check comprising a ring member, a portion adjacent to one edge thereof being approximately cylindrical, the region thereof adjacent to the opposite edge being resilient and including portions inclined inwardly, said last mentioned portions being adapted to engage the circumferential wall of a piston ring groove, said oil check being expansible axially when said inwardly inclined portions are moved toward alignment with said cylindrical portion.

15. An oil check comprising a split ring member, one edge portion thereof being approximately cylindrical for close engagement with the inner surface of a piston ring, the opposite edge portion being resilient and including spaced parts offset inwardly at regions located about said ring, said member at the regions of said offset parts being open between said offset parts and said cylindrical portion and being at least equal in height to the axial overall height of said oil check, said offset parts being inclined relative to the axis of said cylindrical portion.

16. An oil check comprising a split ring member, a portion adjacent to one edge thereof being approximately cylindrical for close engagement with the inner surface of a piston ring, the region thereof adjacent to the opposite edge being resilient and including portions inclined inwardly with respect to the axis of said ring member at spaced regions located about said ring, said member at the regions of said inclined portions being at least equal in height to the axial overall height of said oil check whereby when said inwardly inclined portions are moved toward alignment with said cylindrical portion, the overall height of said oil check is increased.

17. An oil check comprising a split ring member, a portion adjacent to one edge thereof being approximately cylindrical for close engagement with the inner surface of a piston ring, the region thereof adjacent to the opposite edge being resilient and including portions inclined inwardly with respect to the axis of said ring member at spaced regions located about said ring, said member at the regions of said inclined portions being at least equal in height to the axial overall height of said oil check whereby when said inwardly inclined portions are moved toward alignment with said cylindrical portion, the overall height of said oil check is increased.

18. An oil check comprising a split ring member, a portion adjacent to one edge thereof being approximately cylindrical, the region thereof adjacent to the opposite edge being resilient and including portions inclined inwardly with respect to the axis of said ring member at spaced regions located about said ring, said member at the regions of said inclined portions being at least equal in height to the axial overall height of said oil check whereby when said inwardly inclined portions are moved toward alignment with said cylindrical portion, the overall height of said oil check is increased, said oil check being provided with circumferentially spaced openings registering with said inclined portions.

19. An oil check comprising a split ring member, one edge portion thereof being approximately cylindrical, the opposite edge portion being resilient and including spaced parts offset inwardly at regions located about said ring, said member at the regions of said offset parts being open between said offset parts and said cylindrical portion and being at least equal in height to the axial overall height of said oil check, said inwardly offset parts including parts inclined relative to the axis of said cylindrical portion and being of bowed conformation connected at their ends to the material of said oil check but interrupted at their intermediate points to provide cantilever members projecting generally circumferentially to said oil check.

STANLEY S. SLYK.

REFERENCES CITED

The following references are of record in the file of this patent:

UNITED STATES PATENTS

| Number | Name | Date |
|---|---|---|
| 1,239,726 | Sauer et al. | Sept. 11, 1917 |
| 1,439,845 | Seib | Dec. 26, 1922 |
| 1,640,155 | Low | Aug. 23, 1927 |
| 1,720,583 | Walsh | July 9, 1929 |
| 1,766,498 | Frank | June 24, 1930 |
| 1,773,878 | Shannon | Aug. 26, 1930 |
| 2,006,901 | Maller | July 2, 1935 |
| 2,021,830 | Borgfeldt | Nov. 19, 1935 |
| 2,044,845 | Guerriero | June 23, 1936 |
| 2,052,077 | Bristow | Aug. 25, 1936 |
| 2,125,766 | Carlisle | Aug. 2, 1938 |
| 2,173,190 | Wilkening | Sept. 19, 1939 |
| 2,269,944 | Kurth | Jan. 13, 1942 |
| 2,294,177 | Halford | Aug. 25, 1942 |
| 2,321,791 | Beardsley | June 15, 1943 |